US006961087B1

(12) United States Patent
Yoshida

(10) Patent No.: US 6,961,087 B1
(45) Date of Patent: Nov. 1, 2005

(54) PORTABLE ELECTRONIC APPARATUS, IMAGE PROCESSING METHOD, PHOTOGRAPHIC APPARATUS, AND COMPUTER READABLE RECORDING MEDIUM

(75) Inventor: Shigeo Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/069,419

(22) Filed: Apr. 29, 1998

(30) Foreign Application Priority Data

Apr. 30, 1997 (JP) ............................................. 9-112806

(51) Int. Cl.[7] ........................... H04N 5/232; H04N 5/76
(52) U.S. Cl. .................................. 348/231.1; 348/211.2
(58) Field of Search .......................... 348/231.1–231.3, 348/231.5–231.9, 231.99, 14.12, 552, 207.99, 211.2, 211.14; 358/906, 909.1; 386/117, 118, 125, 107; 382/232, 239; 455/566; 711/156, 159

(56) References Cited

U.S. PATENT DOCUMENTS

| | | | | |
|---|---|---|---|---|
| 4,827,347 A | * | 5/1989 | Bell | 348/231.7 |
| 5,170,262 A | * | 12/1992 | Kinoshita et al. | 348/231.99 |
| 5,432,871 A | * | 7/1995 | Novik | 382/232 |
| 5,532,740 A | * | 7/1996 | Wakui | 348/231.2 |
| 5,689,442 A | * | 11/1997 | Swanson et al. | 348/143 |
| 5,806,005 A | * | 9/1998 | Hull et al. | 455/566 |
| 5,829,044 A | * | 10/1998 | Sono | 711/156 |
| 5,852,467 A | * | 12/1998 | Ogino | 348/231.1 |
| 5,943,603 A | * | 8/1999 | Parulski et al. | 348/211.2 |
| 6,094,219 A | * | 7/2000 | Roberts et al. | 348/552 |
| 6,243,108 B1 | * | 6/2001 | Takiyama et al. | 348/231.99 |
| 6,249,313 B1 | * | 6/2001 | Nishi | 348/231.1 |
| 6,253,023 B1 | * | 6/2001 | Fukushima et al. | 386/117 |
| 6,263,106 B1 | * | 7/2001 | Yamagata | 382/232 |
| 6,429,896 B1 | * | 8/2002 | Aruga et al. | 348/552 |

* cited by examiner

*Primary Examiner*—Aung Moe
(74) *Attorney, Agent, or Firm*—Morgan & Finnegan L.L.P.

(57) ABSTRACT

Even when a remaining amount of an image memory built in a digital camera is decreased, the photographing can be further continued while reserving a photographed image. An image which is obtained from an image input unit including image pickup means is accumulated into an image memory. When a remaining amount calculating unit detects that the remaining amount of the image memory is small, an image record discriminating unit compares it with an image size in a photograph mode at that time which is obtained from an image size table, thereby discriminating whether the continuation of the photographing can be performed or not. When the photographing is impossible, an image selecting unit selects an old image, an image in which the number of colors is small, or the like on the basis of management data regarding the photographed images in a memory managing table. The selected image is transmitted by a PHS communication by a data transmitting apparatus. After it was transmitted, the image is erased from the image memory.

13 Claims, 11 Drawing Sheets

STATUS A

STATUS B

PORTABLE ELECTRONIC APPARATUS, IMAGE PROCESSING METHOD, PHOTOGRAPHIC APPARATUS, AND COMPUTER READABLE RECORDING MEDIUM

BACKGROUND OF THE INVENTION

1. Field of the Invention

The invention relates to a portable electronic apparatus such as a digital camera or the like, an image processing method and a photographing apparatus which are used for such an apparatus, and a computer readable recording medium which is used for such method and apparatus.

2. Related Background Art

In recent years, digital cameras have progressively been spread owing to the advancement of a semiconductor technique and the like. However, since a price of an image memory, particularly, a semiconductor memory which can be used in the digital camera is expensive, the number of images which can be photographed by using the image memory which is equipped as a standard memory in the camera is not so enough as compared with a general photographing frequency that is required for the camera. Therefore, a product such that an exchangeable device, for example, a flash memory card or smart memory of PCMCIA is used as an image memory and this image memory is exchanged in accordance with the necessity of the user, and the number of images which can be photographed is increased also exists.

However, it is fairly difficult to obtain the flash memory card or smart memory as compared with the silver salt film and they cannot be always obtained as necessary. When photographing, therefore, the user has to carry an enough large amount of flash memory card or the like for the presumed number of photographing images. Such a situation cannot be said that the feature that an erasable memory device is used as an image memory is effectively used.

If a magnetic memory such as a hard disk or the like is used as an image memory instead of the semiconductor memory, an enough large number of photographing images can be assured as compared with the general photographing frequency that is required for the camera. However, in case of using the magnetic memory, a necessary electric power consumption is large and an external shape of the camera enlarges as compared with that in case of using the semiconductor memory, so that the magnetic memory is improper as a memory device of the digital camera.

As mentioned above, in the present digital camera, since the number of images which can be photographed is limited depending on the degree of obtaining the exchangeable device or the capacity of the built-in image memory, if the user has to photograph images of the number which exceeds the limited number, at the photographing spot, unnecessary images have to be erased from the images which have already been photographed or the user himself must transfer the image memory to the other personal computer or the like and increase the available image memory. Unless otherwise, the user cannot photograph.

However, the execution of such a work at the photographing spot causes a time loss and becomes a large drawback for the camera which requires instantaneousness. Further, in order to judge the unnecessary images from the photographed images, it is necessary to confirm various information. Therefore, the execution of such a work by the digital camera itself whose processing speed is relatively slower than that of the personal computer becomes a large burden for the photographer.

Particularly, in a small display equipped for the digital camera, it is generally difficult to discriminate whether the photographed images are good or not. To efficiently perform such a work, a new key switch group, a display to confirm the information, and the like which are not used in the ordinary digital camera are necessary. They obstruct the realization of miniaturization of the digital camera.

Moreover, a resistance feeling against the work to erase the photographed images at the photographing spot is strong for the photographer. Although there is not such a burden in case of transferring to the other memory device of a personal computer or the like, the user has to carry an interface or the like between the personal computer and the digital camera, it is troublesome, and a physical burden increases.

SUMMARY OF THE INVENTION

It is an object of the invention to solve each or all of the above problems.

Another object of the invention is to enable images to be fetched even when an image memory is insufficient.

Still another object of the invention is to provide a portable electronic apparatus, an image processing method, a photographing apparatus, and a computer readable recording medium of a digital camera or the like, in which even if an image memory is likely to be insufficient, the image memory can be further used while assuring the stored images.

Under the above objects, according to a preferred embodiment of the invention, there is disclosed a portable electronic apparatus comprising: image pickup means for photographing an object and outputting an image signal; image memory means for storing the image signal; and communicating means for automatically transmitting the image signal stored in the image memory means so as to enable a new image signal to be stored into the image memory means.

There is also disclosed an image processing method comprising the steps of: storing a photographed image signal into image memory means; and automatically transmitting the image signal stored in the image memory means so as to enable a new image signal to be stored in the image memory means.

There is also disclosed a computer readable recording medium in which a program to execute the following procedure has been recorded, wherein the procedure comprises the steps of: storing a photographed image signal into image memory means; and automatically transmitting the image signal stored in the image memory means so as to enable a new image signal to be stored into the image memory means.

There is also provided a photographing apparatus comprising: image pickup means for photographing an object and outputting an image signal; image memory means for storing the image signal; remaining amount detecting means for detecting a remaining amount of the image memory means; discriminating means for discriminating whether the photographing by the image pickup means can be performed or not on the basis of the detected remaining amount; image selecting means for selecting an image signal from the image memory means on the basis of a predetermined selecting condition when a discrimination result indicates the photographing is impossible; and communicating means for transmitting the selected image signal.

Further another object of the invention is to enable a wireless image communicating function to be effectively used.

Further another object of the invention is to provide a portable electronic apparatus and a photographing apparatus in which usability is improved.

Still another object of the invention is to provide a cellular phone and a photographing apparatus having a new function.

The above and other objects and features of the present invention will become apparent from the following detailed description and the appended claims with reference to the accompanying drawings.

DETAILED DESCRIPTION OF THE PREFERRED EMBODIMENTS

Figure 1:
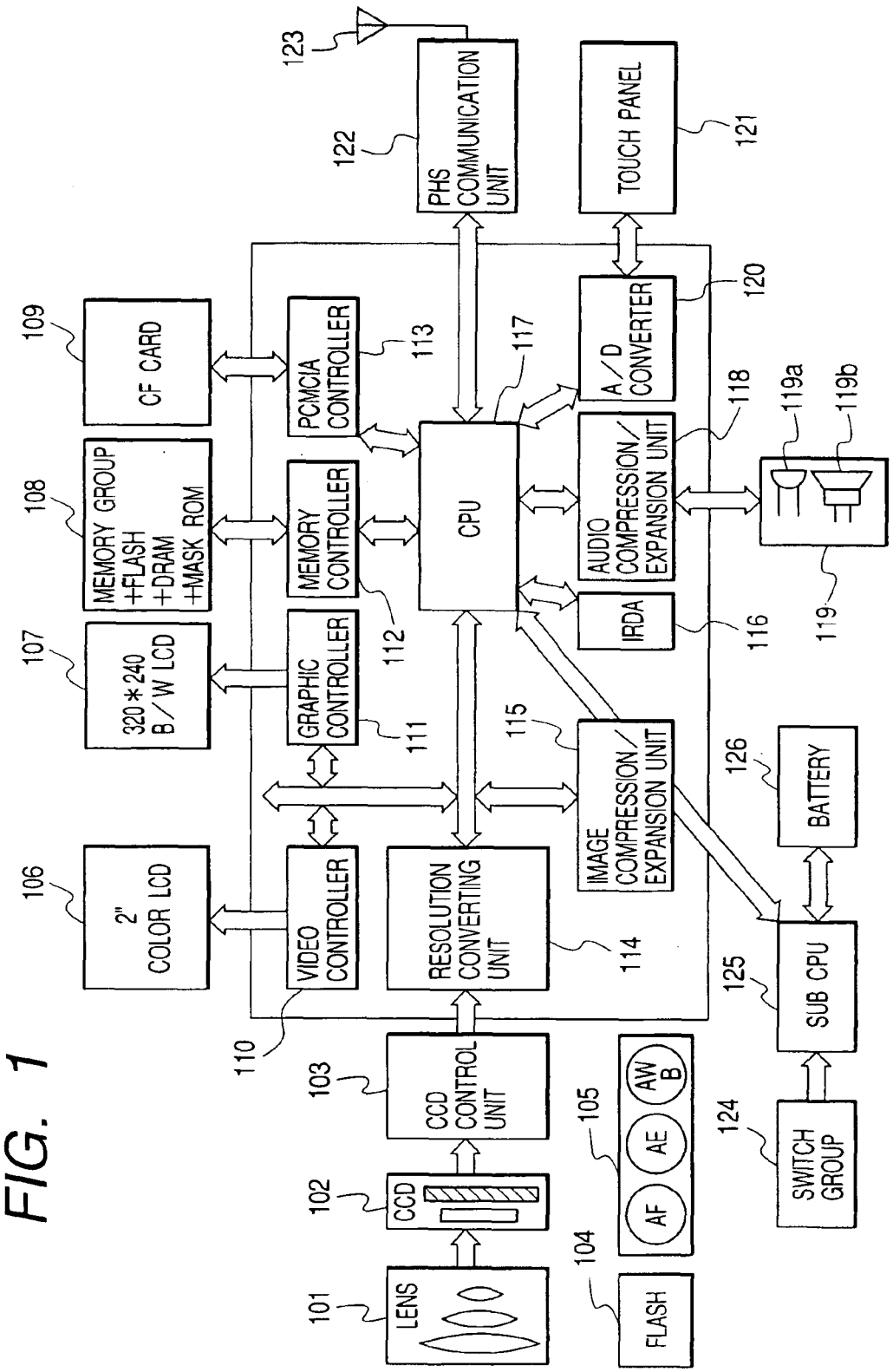
FIG. 1 is a block diagram showing an embodiment of a digital camera to which the invention is applied.

FIG. 1 is a block diagram showing a construction of a digital camera to which the invention is applied.

In FIG. 1, reference numeral 101 denotes a lens using a triple manual zooming system in the embodiment. A low pass filter of an optical system is equipped to reduce a color moire.

Reference numeral 102 denotes a color CCD image sensor (hereinafter, simply referred to as a CCD) of, for example, a full pixel reading system of 330,000 square pixels of ¼ inch. The light converged by the lens 101 is formed as light on the surface of the CCD 102 and is converted into an electric signal.

Reference numeral 103 denotes a CCD control unit for generating a timing signal for the CCD 102, sampling and holding of image data outputted from the CCD 102, an A/D conversion, a color space conversion of YUV→RGB, and a gain control and also controls a flash 104 and an AF/AE/AWB operating unit 105.

Reference numeral 104 denotes the built-in flash which is charged or which emits light by an instruction from the CCD control unit 103 at night or the like.

Reference numeral 105 denotes the operating unit of AF (auto-focusing), AE (auto-exposure), and AWB (auto white balance).

Reference numeral 106 denotes a TFT color display of 2 inches made of low temperature polysilicon. The display 106 is connected to a video LCD controller 110 by an NTSC interface. The color display 106 displays a color image as a view finder and a color image recorded in the image memory and displays a color image transmitted by communication.

Reference numeral 107 denotes a black and white STN liquid crystal display of (320×240) dots. A touch panel 121 is attached onto the display surface of the display 107. The display 107 displays characters and also displays a button, a window, and the like for the inputting operation from the user by using the touch panel 121 and is connected to a graphic LCD controller 111 by a digital interface.

Reference numeral 108 denotes a memory group comprising a flash memory of 4 MB which is used as an image memory, which will be explained hereinlater, a DRAM of 4 MB to execute a built-in OS and a program, and a mask ROM of 6 MB to store the program.

Reference numeral 109 denotes a compact flash card. The card 109 is a separating type semiconductor memory which is used as an auxiliary storage of the image memory. The flash card 109 is connected to a PCMCIA controller 113 by a PCMCIAATA interface.

Reference numeral 110 denotes a video LCD controller having a frame memory for an NTSC picture plane. The controller 110 has a scan converter function for performing a conversion of resolution and an absorption of a timing in order to display RGB image data which is transmitted from the image memory provided in the CCD control unit 103 or memory group 108 onto the NTSCTFT display.

Reference numeral 111 denotes a graphic LCD controller having a video memory for a graphic picture plane. The controller 111 is used for display of a text, GUI, or the like and is used to display data stored in a DRAM, mask ROM, or the like in the memory group 108.

Reference numeral 112 denotes a memory controller for generating a timing signal and a signal for various memories of the memory group 108.

Reference numeral 113 denotes the PCMCIA controller which is connected to a built-in type RISCCPU which is used in the digital camera and serves as an interface to a compact flash card 109.

Reference numeral 114 denotes a resolution converting unit for converting resolution by performing a temporary storage and a sampling of the image data which is transmitted by the CCD control unit 103. For example, upon framing of the digital camera, since there is no need to process all of the data, the image of (640×480) dots which is outputted from the CCD control unit 103 is thinned out and converted into the image of (160×120) dots by the resolution converting unit 114 and is transferred to the video LCD controller 110. Upon normal photographing, the image data is temporarily stored into a buffer as an image of (640×480) dots as it is and, after that, the image data is transferred to an image compression/expansion unit 115 or a CPU 117.

Reference numeral 115 denotes the image compression/expansion unit for compressing and expanding the image. In the embodiment, hardware for performing compression and expansion of JPEG or Wavelet is installed. Such a compression and expansion system is not limited by the embodiment but other various methods can be applied. After the data formed as an image onto the CCD 102 was signal processed by the CCD control unit 103, for example, the JPEG image compression is performed by the image compression/expansion unit 115 and is compressed to about 1/15 of the original image. Since the quantization table and the Huffman coding table have rewritable structures, by rewriting the contents in the table 3, a compression ratio can be changed. Although the ordinary digital camera has a function for making a file size per image constant and making the management of the number of images which can be photographed easy, in the embodiment, this function is embodied by performing the compression a plurality of times. That is, when a data size is larger than the set file size, the coding table is changed so as to increase the compression ratio. When it is smaller than the set file size, the coding table is changed so as to reduce the compression ratio.

Reference numeral 116 denotes an infrared standard interface (IrDA) including a light emitting unit and a photosensing unit. The interface 116 is used when exchanging data with other notebook computers or the like.

Reference numeral 117 denotes a built-in type RISC microprocessor (CPU) for performing various controls of the digital camera.

Reference numeral 118 denotes an audio compression/expansion unit for compressing and expanding an audio signal. The audio compression/expansion unit 118 compresses the digital audio data transmitted from a microphone 119a provided in an audio input/output unit 119 and an A/D converter by a method such as ADPCM, GSM, or the like and transfers the compressed data to the CPU 117. After the digital audio data arrived from the CPU 117 was D/A converted by the audio input/output unit 119, the converted analog signal is generated as a sound from a speaker 119b.

Reference numeral 121 denotes an analog touch panel of the resistance dividing type installed on the black and white display 107. Various data, instructions, and the like are inputted by the touch panel 121. The data outputted by the touch panel 121 is converted into digital data by an A/D converter 120 and is transmitted to the CPU 117.

Reference numeral 122 denotes a PHS communication unit for communicating various data which is communicated with the CPU 117 to a PHS base station by PIAFS and ARIBSTD28 protocol.

Reference numeral 123 denotes an antenna of the PHS communication unit 122.

Reference numeral 124 denotes a switch group such as shutter button, marking button, and the like for inputting instructions from the user. Particularly, a half-pressing state and a full-pressing state of the shutter switch (button) are detected. Detection signals are supplied to a sub CPU 125, through which they are transmitted to the CPU 117.

The sub CPU 125 has a function for saving an electric power consumption of the whole system by performing a power management including a battery 126.

FIGS. 2A to 2D are external views of a digital camera according to the embodiment.

The digital camera is mechanically largely divided into a block shown at 201 in which an antenna, lenses, and the like are enclosed and a block shown at 202 in which a color display and a microphone are enclosed.

In the block 201, the lens 101, antenna 123, IrDA interface 116, battery 126, speaker 119b, switch group 124, black and white display 107, and touch panel 121 shown in FIG. 1 are provided. Reference numeral 203 denotes a shutter switch (button) provided for the switch group 124 in FIG. 1.

In the block 202, the microphone 119a and color display 106 shown in FIG. 1 are provided.

Figure 2A:
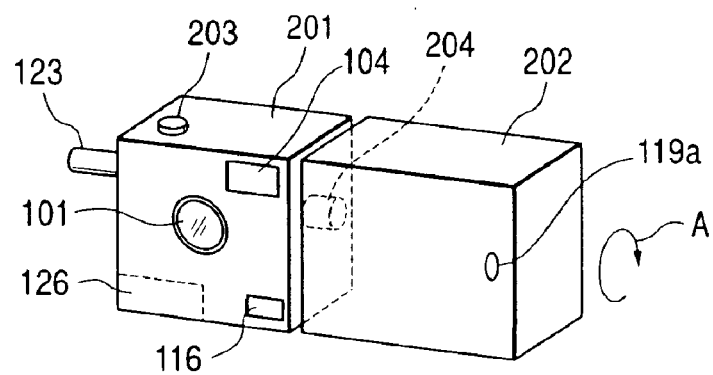
FIGS. 2A, 2B, 2C and 2D are external perspective views of the digital camera according to the first embodiment of the invention.
Figure 2B:
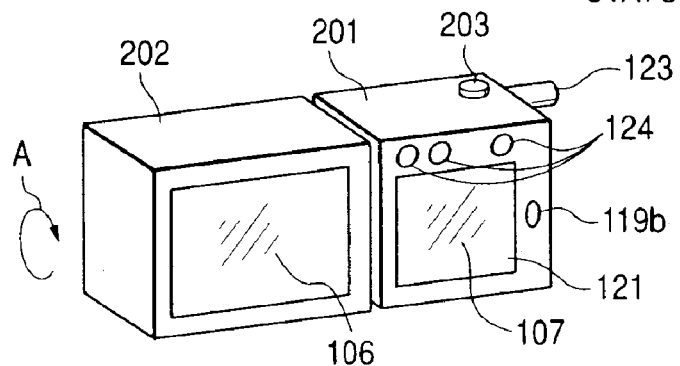
Figure 2C:
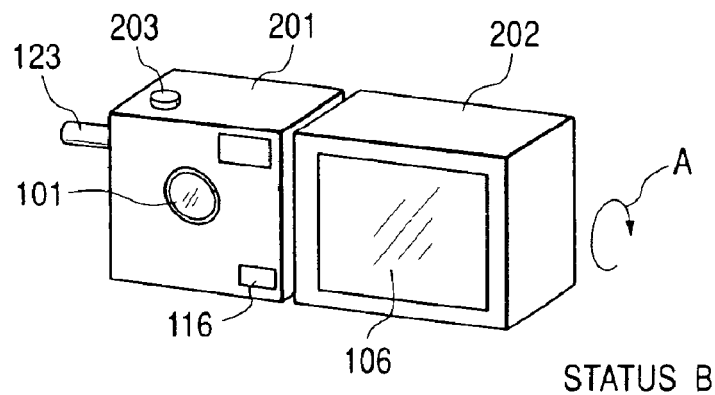
Figure 2D:
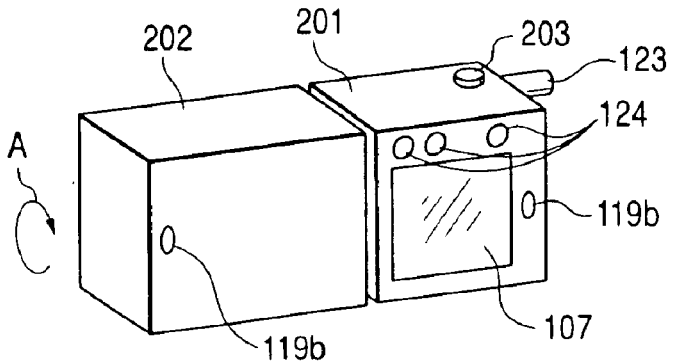

As shown in FIG. 2A, the blocks 201 and 202 are connected by an axis 204 and can be rotated by 360° around the axis 204 as a center as shown by an arrow A. As shown in FIGS. 2A and 2B, consequently, upon photographing as an ordinary camera, the user can photograph an object while looking at the object via the color display 106, so that an operating feeling without a sense of physical disorder as a camera is obtained (status A). By rotating the block 202 as shown in FIGS. 2C and 2D, the user can photograph the object while observing a self object image (status B). In the status B, since the microphone 119a and speaker 119b are located on the same plane, the apparatus can be used as a cellular phone and its operating feeling is extremely natural. On the other hand, in the status A, since the microphone 119a is directed toward the object and the speaker 119b is directed toward the photographer, the apparatus can be naturally operated as a movie camera to photograph a moving image.

Figure 3:
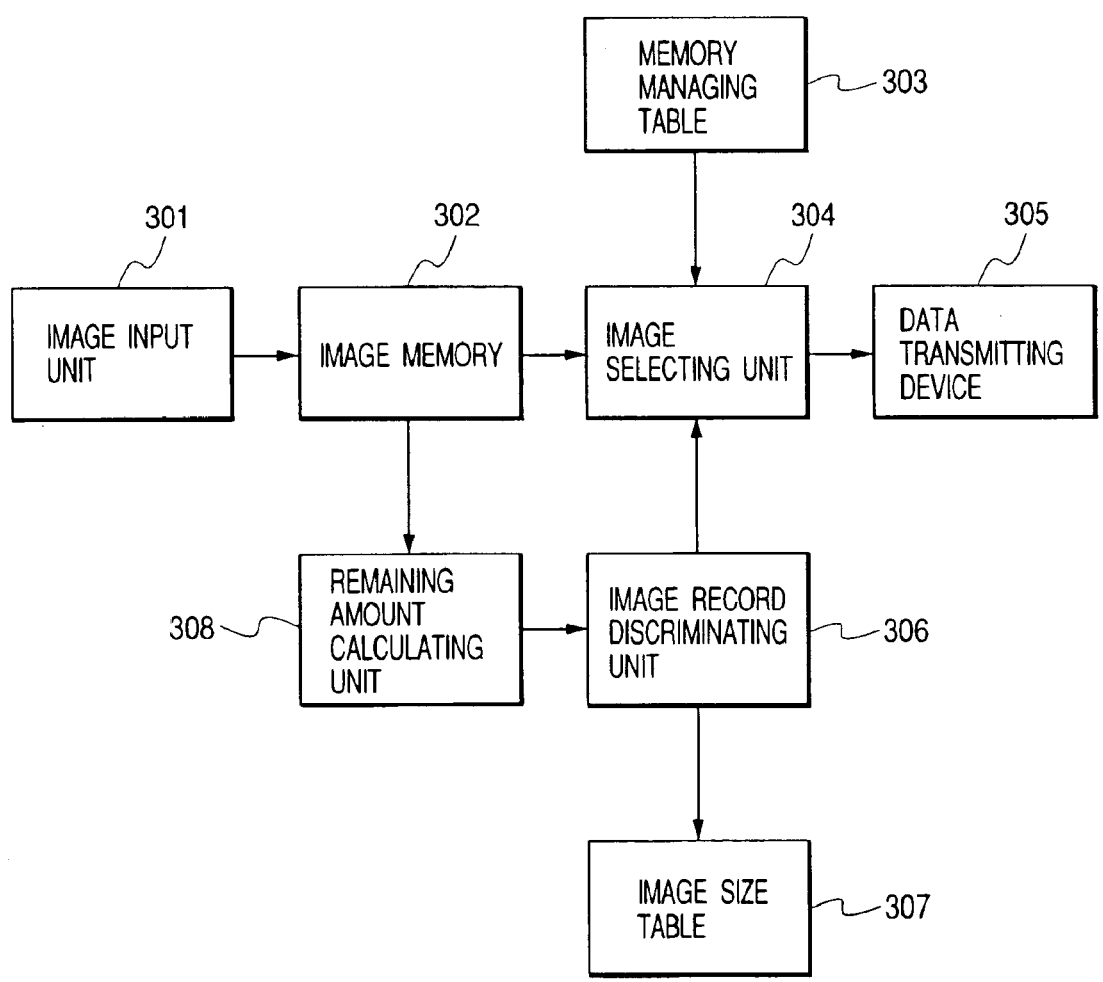
FIG. 3 is a block diagram showing the first embodiment of the invention.

FIG. 3 is a block diagram showing the first embodiment of the invention extracted from the construction of FIG. 1.

In FIG. 3, reference numeral 301 denotes an image input unit including image pickup means. The image input unit 301 executes a signal process of the image inputted by the lens 101 and is constructed while including each unit of 101, 102, 103, 114, 117, and 112 in FIG. 1.

Reference numeral 302 denotes an image memory. A flash memory in the memory group 108 in FIG. 1 is used.

Reference numeral 303 denotes a memory managing table constructed in the flash memory. An example of items of the contents stored in this table and the contents of a table stored there is shown in Table 1.

TABLE 1

| Name | Size | Recording date/time | Accessing date/time | The number of accessing times | Marking | The number of colors used | Recording location |
|---|---|---|---|---|---|---|---|
| MX0001.jpg | 25 KB | Dec. 25, 1996 PM3:00 | Jan. 7, 1997 PM10:00 | 3 | x | 32768 | 100 |
| MX0002.jpg | 50 KB | Dec. 31, 1996 AM9:45 | Dec. 31, 1996 AM9:45 | 1 | ∘ | 66536 | 125 |

TABLE 1-continued

| Name | Size | Recording date/time | Accessing date/time | The number of accessing times | Marking | The number of colors used | Recording location |
|---|---|---|---|---|---|---|---|
| MX0003.jpg | 100 KB | Jan. 3, 1997 PM2:10 | Jan. 5, 1997 AM3:00 | 1 | x | 37 | 175 |
| MX0004.jpg | 50 KB | Jan. 7, 1997 AM10:30 | Jan. 7, 1997 PM9:30 | 7 | x | 65536 | 275 |

In Table 1, there are four JPEG images of MX0001.jpg to MX0004.jpg and information of a size, a recording date/time, an accessing date/time, the number of accessing times, marking information, the number of colors used, and a recording location of each image has been recorded. The above information is used in a transmission image selecting algorithm, which will be explained hereinlater.

In FIG. 3, reference numeral 304 denotes an image selecting unit. When the recording is OK on the basis of a discrimination signal which is sent from an image record discriminating unit 306, the image selecting unit 304 executes nothing. However, when the recording is NG, the image selecting unit 304 selects a proper image from the memory managing table 303 by an algorithm, which will be explained hereinlater, and transfers the selected image to a data transmitting device 305. In FIG. 1, this means that the CPU 117 executes processes in accordance with a program stored in an ROM in the memory group 108 and the image is transferred from the flash memory in the memory group 108 to the PHS communication unit 122.

Reference numeral 305 denotes the data transmitting device and PHSPIAFS is used as a transmitting system in the embodiment. The data transmitting device is constructed by including the PHS communication unit 122 and antenna 123 in FIG. 1.

Reference numeral 306 denotes the image record discriminating unit for comparing a remaining amount of the image memory 302 which is sent from a remaining amount calculating unit 308 with an image size written in an image size table 307, thereby judging whether the remaining photographing operation can be performed or not. In this judgment, information in the image size table 307, namely, information indicating to which size the image mode selected at present corresponds is used as a reference of discrimination.

Reference numeral 307 denotes the image size table and its contents are shown in Table 2. The table 307 is stored in the ROM in the memory group 108 in FIG. 1.

TABLE 2

| Recording image mode | Memory size necessary per image memory |
|---|---|
| Economy | 25 kB |
| Normal | 50 kB |
| Fine | 100 kb |

In Table 2, there are Economy, Normal, and Fine as recording image modes. Memory sizes which are necessary for recording in those modes are set to 25 kB, 50 kB, and 100 kB per image, respectively.

Reference numeral 308 denotes the remaining amount calculating unit for calculating a remaining amount of a flash memory serving as an image memory 302 of the memory group 108 by the CPU 117.

Figure 4:
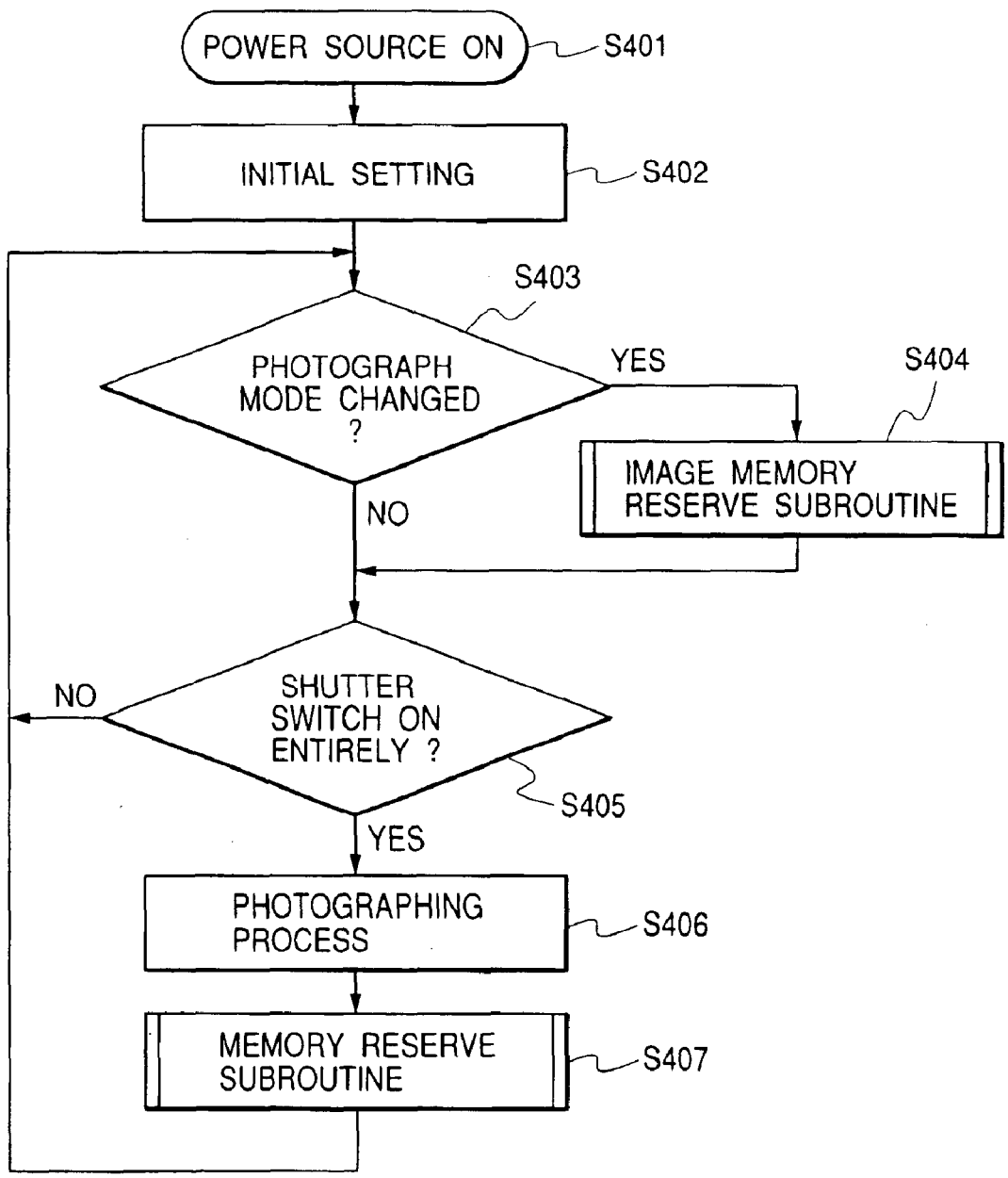
FIG. 4 is a flowchart showing a whole control of the first embodiment of the invention.

FIG. 4 is a flowchart showing a whole control of the embodiment.

In step S401, a power source is turned on and the processing routine is started.

In step S402, an initial setting of various devices and circuits is performed.

In step S403, a check is made to see if the photograph mode has been changed. For example, a check is made to see if the photograph mode of Economy, Normal, or Fine mentioned above has been changed from the former mode. If it was changed, since there is a possibility that a necessary capacity of the image memory 302 cannot be reserved, an image memory reserve subroutine is called in step S404. If the photograph mode is not changed, since this means that the image memory 302 has been reserved, the processing routine advances to step S405.

In step S405, a check is made to see if the shutter switch 203 has been fully depressed and turned on. If it is not ON, the control is again shifted to step S403. If it is ON, since this means that the picture was taken, a photographing process is executed in step S406. Since the photographing is finished in step S407, the memory reserve subroutine is called for preparation of a next photographing.

Figure 5:
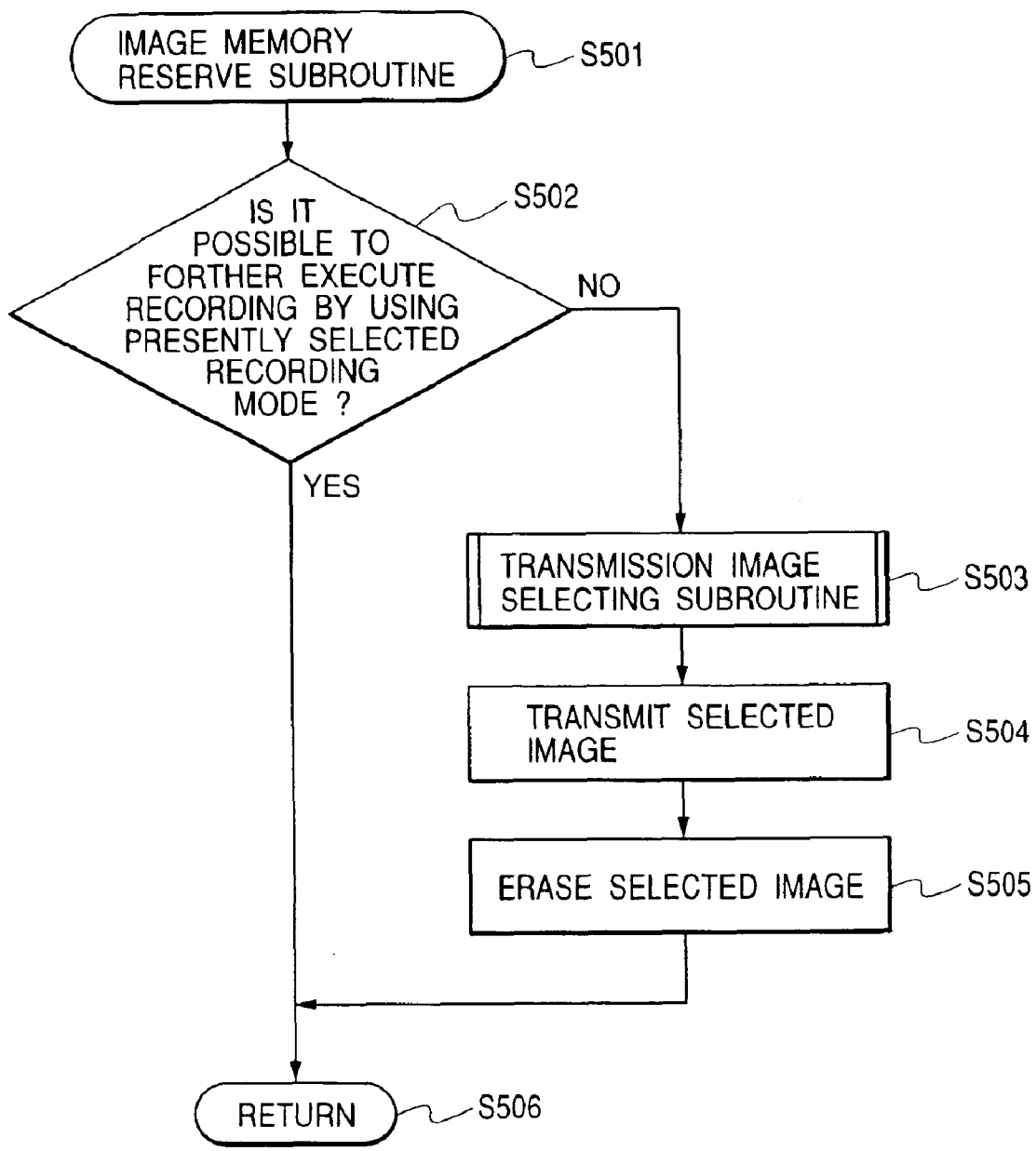
FIG. 5 is a flowchart showing a control to assure an image memory in the first embodiment of the invention.

FIG. 5 is a flowchart showing a control for reserving the image memory in steps S404 and S407.

When the processing routine is started in step S501, the remaining amount of the image memory 302 is detected in step S502 in order to discriminate whether the recording can be further performed by using the recording mode selected at present. The image memory amount used by the image which has already been stored is calculated by using the memory managing table 303 in Table 1 and the remaining memory amount which can be used is calculated from the calculated used image memory amount. The above discrimination about the recording is made on the basis of the calculated value of the remaining memory amount which can be used, the recording image mode as contents of the image size table 307 in Table 2, and the memory size necessary per image.

If the recording can be further performed, since there is no problem, the processing routine is returned to the former process in step S506.

If the recording is impossible, a transmission image selecting subroutine is called in step S503.

In step S504, the image selected in step S503 is transmitted by the data transmitting device 305.

In step S505, the image transmitted in step S504 is erased from the image memory 302, thereby increasing the remaining amount of the image memory 302, so that a new photographing can be performed. After that, the processing routine is returned to the former process in step S506.

Figure 6:
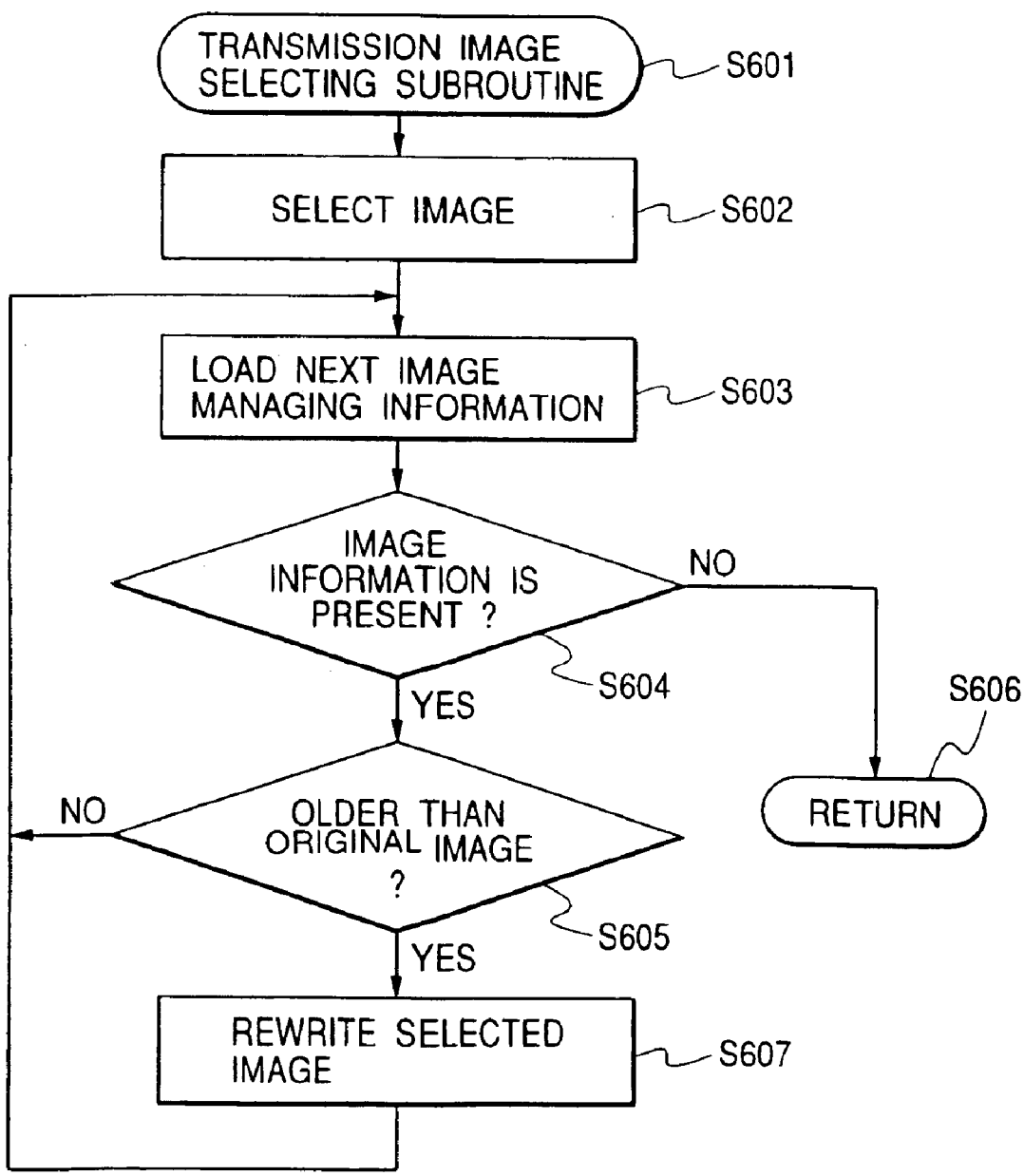
FIG. 6 is a flowchart showing a control method of an image selecting unit in the first embodiment of the invention.

FIG. 6 is a flowchart showing a control method in step S503 by the image selecting unit 304.

When the processing routine is started in step S601, a temporary image is automatically selected by using image management information locating at the head of the memory managing table 303 in Table 1 in step S602. Such a selection can be performed by the user himself or can be automatically executed by the apparatus.

In step S603, image management information of a next image in the memory managing table 303 in Table 1 is loaded.

In step S604, whether the loading is successful in step S603 or not is discriminated. If it is unsuccessful, since this means that there is no remaining image, the image which has already been selected is the oldest image.

If the loading is successful, since this means that there are still images, the control is shifted to step S605.

In step S605, the making date/time is extracted from the image management information loaded in step S603 and a check is made to see if the date of the image is older than the making date/time of the image which has been selected at present.

If it is not old, since the image selected at present is the oldest image, next image management information is retrieved from step S603.

If it is older, in step S607, the image selected in step S602 is replaced by the image of the image management information loaded in step S603.

Figure 7:
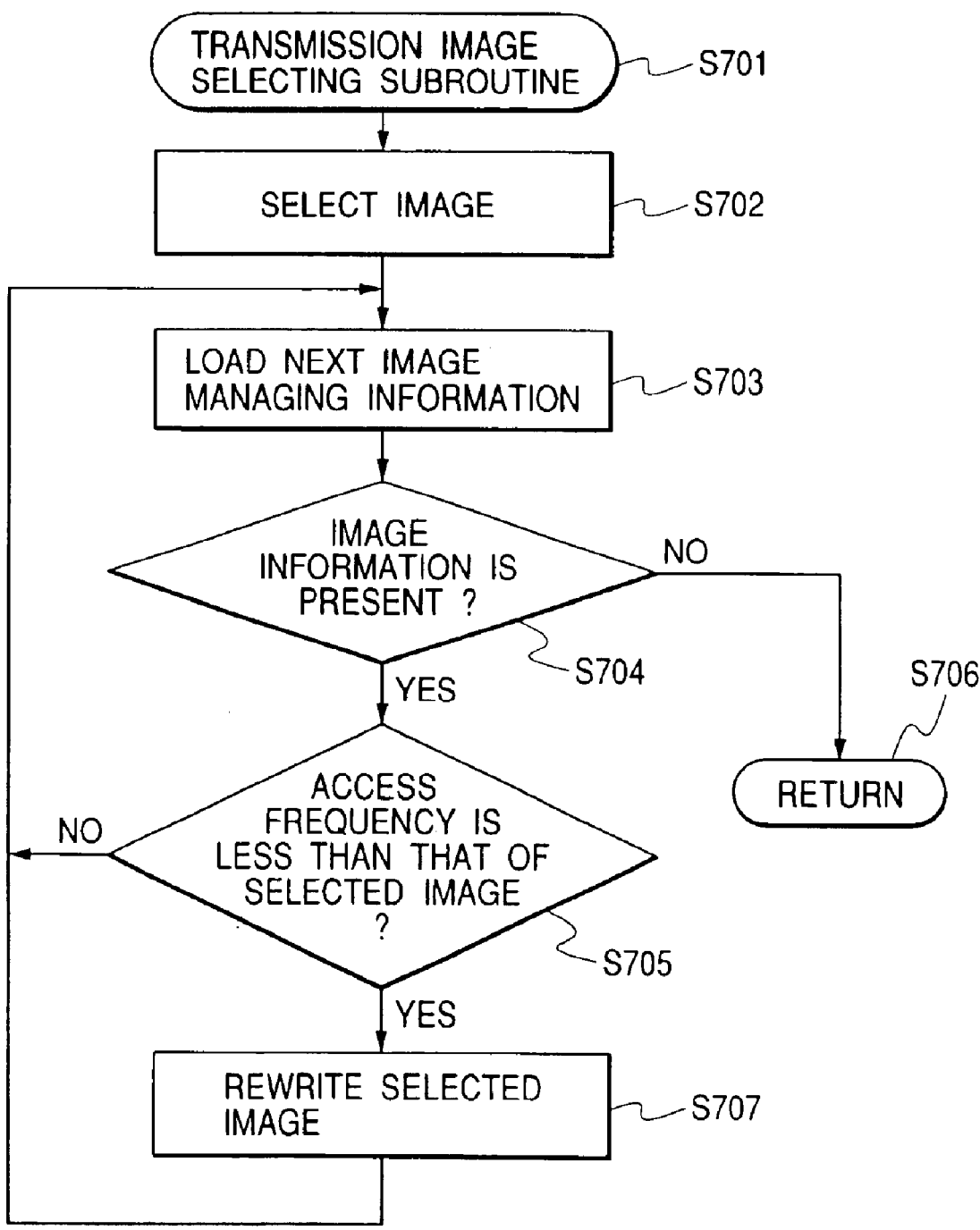
FIG. 7 is a flowchart showing another control method of the image selecting unit in the first embodiment of the invention.

FIG. 7 is a flowchart showing another control method of step S503 by the image selecting unit 304.

Processes in steps S701 to S704, S706, and S707 are similar to those in steps S601 to S604, S606, and S607 in FIG. 6. However, in step S705, an access frequency is extracted from the image management information loaded in step S703 and a check is made to see if it is smaller than an access frequency of the image selected at present.

If it is larger, the processing routine is returned to step S703 and next image management information is retrieved.

If it is smaller, since this means that the image selected at present has the smallest access frequency, namely, the number of application fields is small, step S707 follows and the image selected in step S702 is replaced by the image of the image management information loaded in step S703.

As another algorithm for selecting a transmission image, an algorithm of transmitting an image in which the number of colors used in the image is small is transmitted is also considered. This method uses a principle that the image in which the number of colors is small is an image failed due to an erroneous light emission of stroboscope or the like.

Similarly, an algorithm of selecting the image in which the number of colors is large is also considered. This is because even if the image having a large number of colors is compressed, since a file size is often large, a memory capacity which can be used after the transmission increases.

Upon photographing, the marking information of the photographer who inputted by using the switch group 124 in FIGS. 2A to 2D or the like can be also used. The photographer has already grasped whether the photograph is important or not to a certain degree when he takes it.

By using this principle, the image marked by pressing the marking button upon photographing or the image which is not marked is preferentially used as means for selecting the transmission image. Such a process intends to give a priority of the image at the time of photographing.

Each of the above algorithms is not limited to a case of solely using it but can be also used in combination.

According to the embodiment, the image data is automatically transmitted from the image memory irrespective of the operation of the user and the remaining amount of the memory automatically increases. Therefore, the apparatus can be easily used.

The second embodiment will now be described.

Although a construction of the digital camera in the second embodiment is similar to that of the first embodiment, a whole control method differs from that of the first embodiment. That is, by pressing the shutter switch to about the half position, the operation to reserve the image memory is started.

Figure 8:
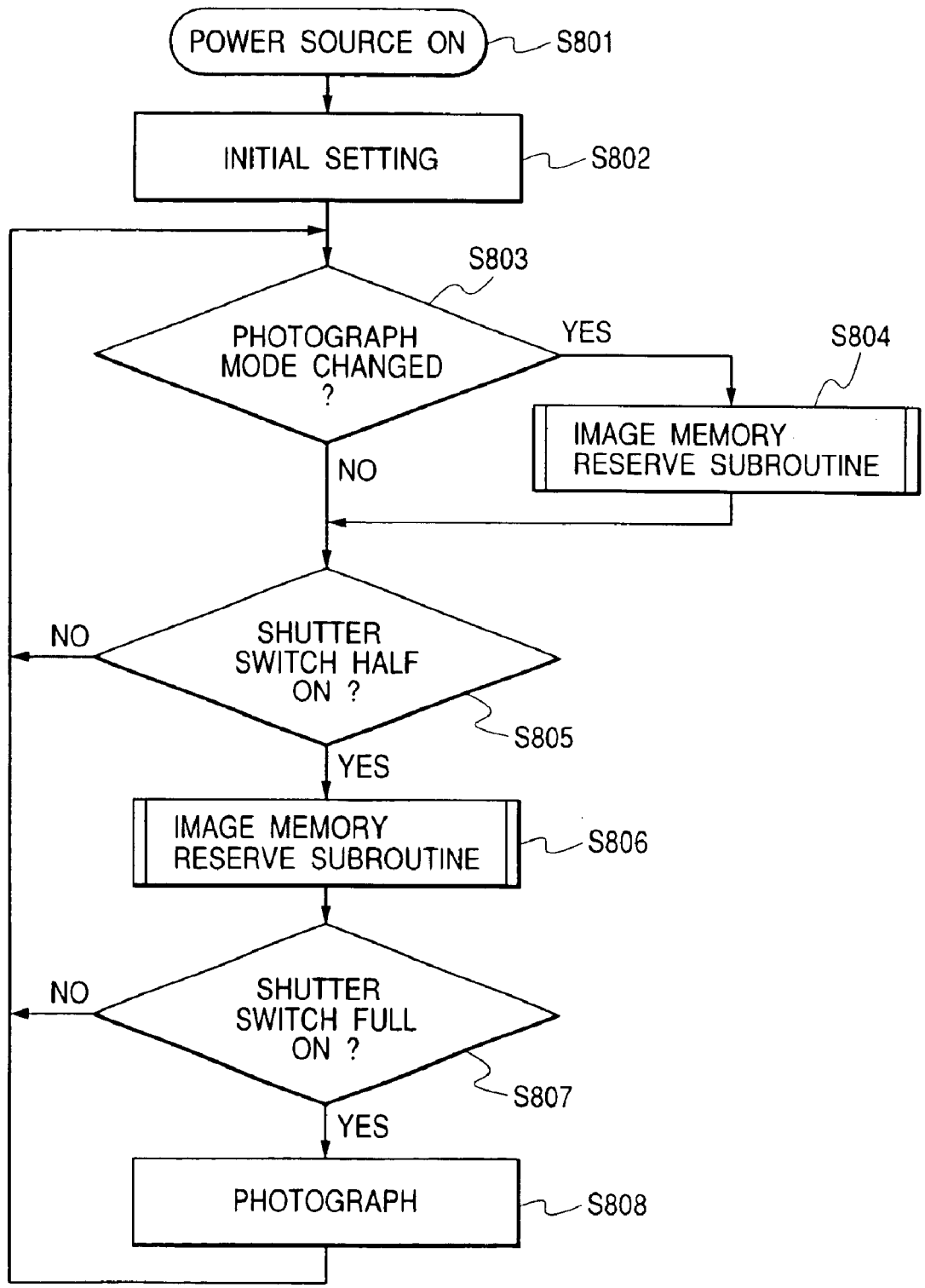
FIG. 8 is a flowchart showing a whole control of the second embodiment of the invention.

FIG. 8 shows a flowchart for the whole control according to the second embodiment.

When the power source is turned on in step S801, an initial setting of various devices and circuits is executed in step S802.

In step S803, a check is made to see if the photograph mode has been changed. For example, a check is made to see if the photograph mode of Economy, Normal, or Fine has been changed from the former mode. If it was changed, since there is a possibility that a necessary capacity of the image memory cannot be reserved, an image memory reserve subroutine is called in step S804. If the photograph mode is not changed, since this means that the image memory has been reserved, the processing routine advances to step S805.

In step S805, a check is made to see if the shutter switch has been depressed to about the half position. If YES, since this means that the user tries to photograph, the image memory reserve subroutine is called for preparation of photographing in step S806. If the shutter switch is not pressed, since this means that the user does not intend to photograph yet, the processing routine is returned to step S803.

In step S807, a check is made to see if the shutter switch has fully been pressed. If the shutter switch is not ON, since this means that the picture was taken, the control is again shifted to step S803. If it is ON, the photographing process is executed in step S808.

The third to fifth embodiments will now be described.

It is a feature of the third to fifth embodiments that when the remaining amount of the image memory is insufficient, an image is selected in a manner similar to the first embodiment, and image processes such as change in compressing method or compression ratio, conversion of resolution, reduction of the number of colors, and the like are again executed with respect to such an image, thereby constructing a new image of a size smaller than that of the original image, and the new image is written into the original image memory, thereby reserving the image memory.

Figure 9:
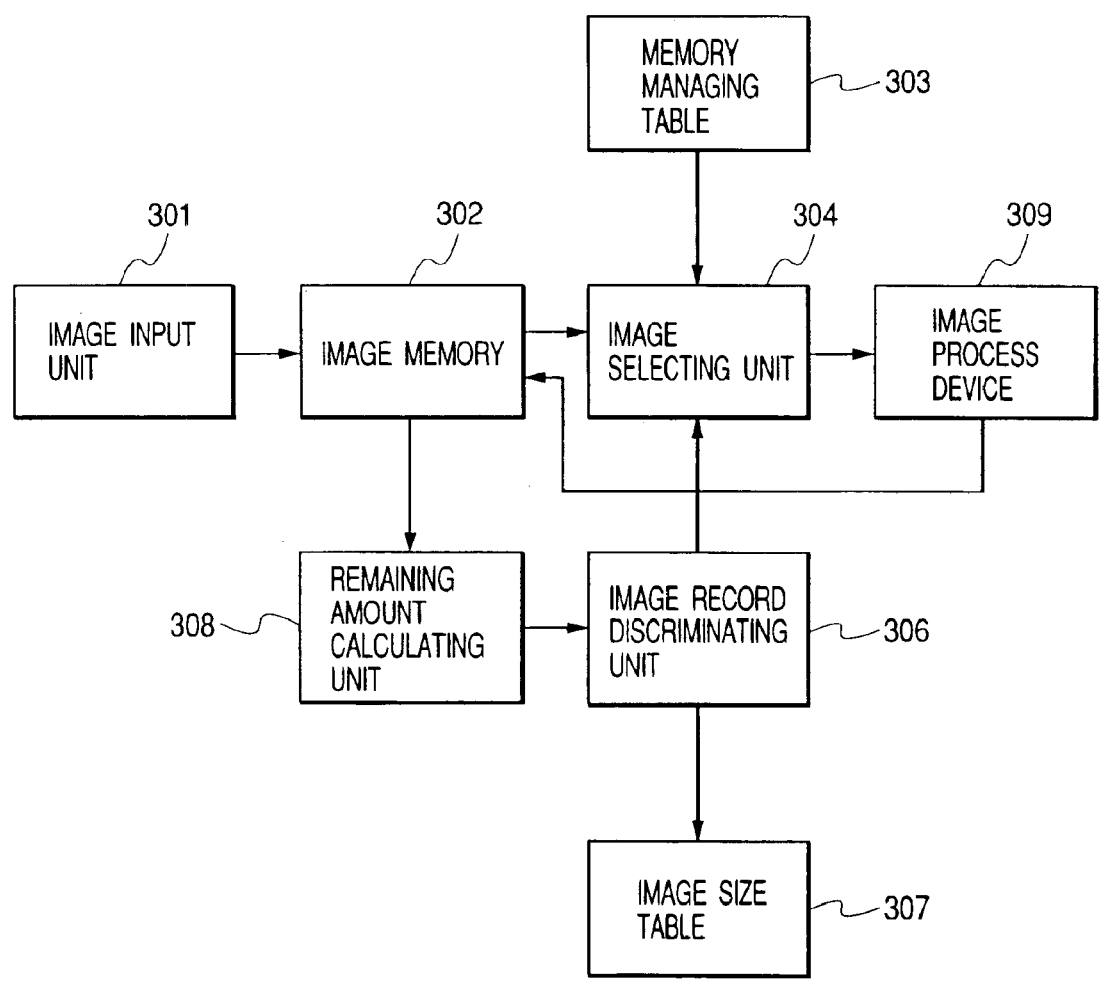
FIG. 9 is a block diagram showing the third embodiment of the invention.

FIG. 9 shows the third embodiment and the portions which substantially correspond to those in FIG. 3 are designated by the same reference numerals and their overlapped explanations are omitted.

When the recording is OK by the discrimination signal which is sent from the image record discriminating unit 306, the image selecting unit 304 executes nothing. However, if it is NG, the image selecting unit 304 selects the proper image from the memory managing table 303 by the algorithm mentioned in FIGS. 6 and 7 and transfers the selected image to an image processing apparatus 309 by the embodiment. This denotes that, in FIG. 1, the CPU 117 executes the processes by the program stored in the ROM in the memory group 108 and transfers the image data from the flash memory in the memory group 108 to the image compression/expansion unit 115.

The image processing apparatus 309 is realized by programs which are executed by the image compression/expansion unit 115, resolution converting unit 114, CPU 117, and memory group 108. Such an image processing method will be described hereinlater with reference to FIGS. 10 to 12.

Figure 10:
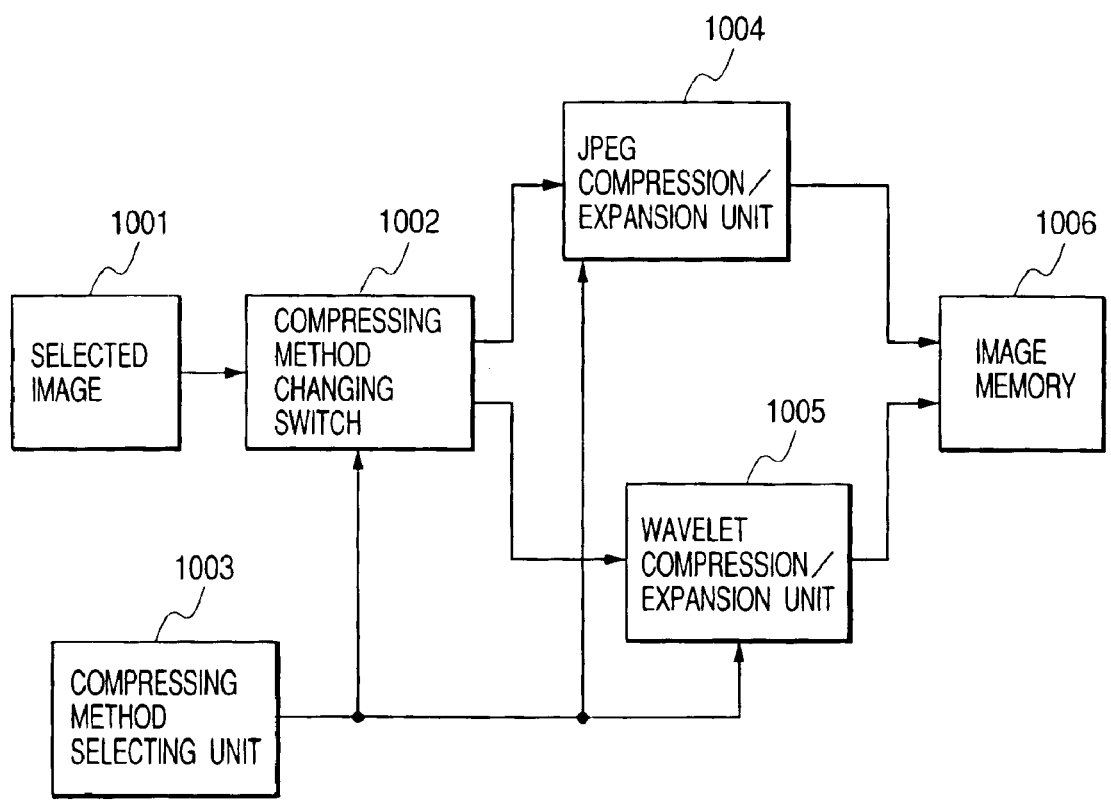
FIG. 10 is a block diagram of an image processing apparatus according to the third embodiment of the invention.

FIG. 10 is a block diagram showing a constructional example of the image processing apparatus 309.

The embodiment intends to reduce the image size by switching a method of compressing and expanding the image selected by the image selecting unit 304. For example, according to the Wavelet compressing method, the image quality can be further improved in case of a high compression ratio as compared with the JPEG compressing method. This is because in case of a high compression image, a block distortion of (8×8) becomes conspicuous according to the JPEG compressing method. On the other hand, in the Wavelet compression, the image deteriorates as if it was blurred, and since it is a natural image deterioration for the human being, a feeling of physical disorder is small.

In FIG. 10, reference numeral 1001 denotes an image which is selected by the image selecting unit 304 and is processed.

Reference numeral 1002 denotes a compressing method changing switch for selecting by which compressing method the image is processed. The switch 1002 is arranged on a data bus by which the selected image is transferred to compression/expansion units 1004 and 1005.

Reference numeral 1003 denotes a compressing method selecting unit. Usually, compatibility and a high picture quality are realized by using the JPEG compression of a low compression ratio, for example, 1/15. When the remaining amount of the image memory is becoming lacking, the compressing method changing switch 1002 and the compression ratio are set into the compression/expansion units 1004 and 1005 so as to use the Wavelet compression of a high compression ratio, for example, 1/100.

Reference numeral 1004 denotes the JPEG compression/expansion unit comprising a compressing/expanding circuit and an image buffer for work.

Reference numeral 1005 denotes the Wavelet compression/expansion unit comprising a compressing/expanding circuit and an image buffer for work.

Reference numeral 1006 denotes an image memory in which an image of a small size as a result of processing is written.

The fourth embodiment will now be described with reference to FIG. 11.

The embodiment relates to another constructional example of the image processing apparatus 309 in FIG. 9. The image size is reduced by decreasing resolution (the number of constructing dots) of the image selected by the image selecting unit 304 in FIG. 9. For example, ordinarily, the object is photographed by resolution of (640×480) and the photographed image data is recorded into the image memory. When the remaining amount of the image memory is small, the pixels of the image of (640×480) are thinned out to the pixels of (320×240) and the resolution is changed to low resolution, thereby reducing the image size.

Figure 11:
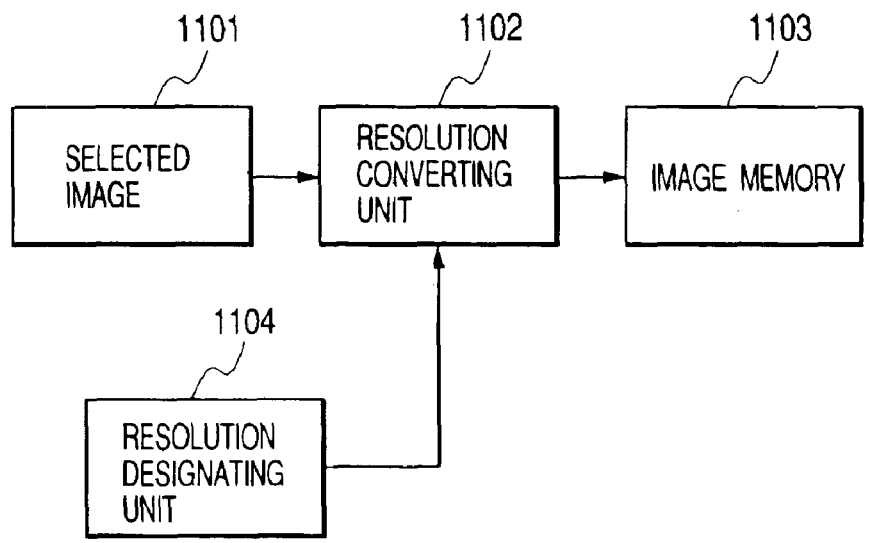
FIG. 11 is a block diagram showing an image processing apparatus according to the fourth embodiment of the invention.

In FIG. 11, reference numeral 1101 denotes an image which is selected by the image selecting unit 304 and is processed.

Reference numeral 1102 denotes a resolution converting unit of the image. The resolution converting unit 114 in FIG. 1 corresponds to the resolution converting unit 1102.

Reference numeral 1103 denotes an image memory in which the image of the small size as a processing result is written.

Reference numeral 1104 denotes a resolution designating unit. Generally, a high picture quality is realized by recording the image of the high resolution. When the remaining amount of the image memory is becoming lacking, the resolution is converted to low resolution by a thinning-out or interpolating process.

The fifth embodiment will now be described with reference to FIG. 12.

The embodiment relates to further another constructional example of the image processing apparatus 309. The image size is reduced by decreasing the number of bits constructing the image selected by the image selecting unit 304. For example, usually, color is constructed by the bit number of 24 bits and, when the remaining amount of the image memory is small, the number of constructing bits is decreased to 9 bits, thereby reducing the image size.

Figure 12:
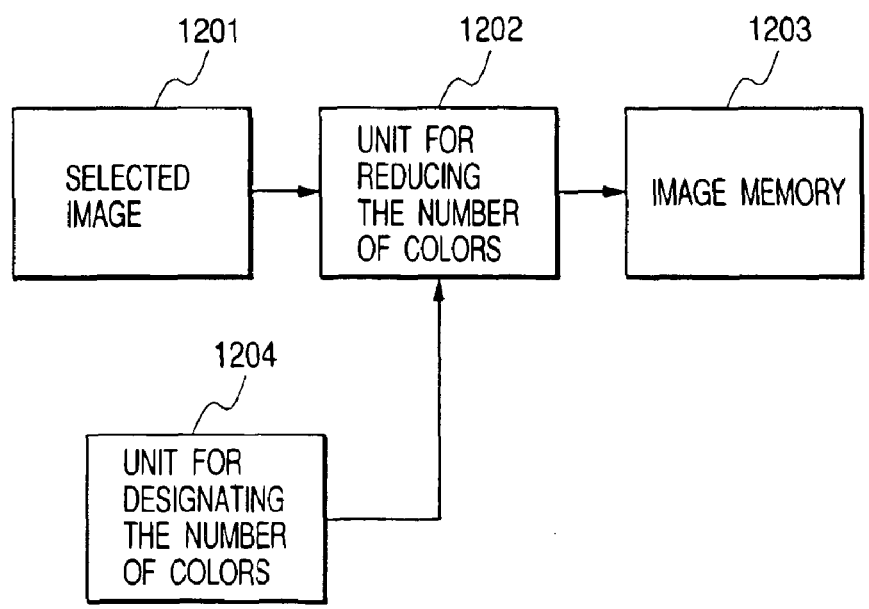
FIG. 12 is a block diagram showing an image processing apparatus according to the fifth embodiment of the invention.

In FIG. 12, reference numeral 1201 denotes the image which is selected by the image selecting unit 304 and is processed.

Reference numeral 1202 denotes a unit for reducing the number of colors of the image. The image is once expanded by using the image compression/expansion unit 115. The CPU 117 reduces the number of constructing bits in the memory group 108 by the program stored in the memory group 108. For example, so long as 24 bits, since each of the R, G, and B data consists of 8 bits, it is sufficient to reclassify them to 3 bits on each plane. After that, the image is compressed by the image compression/expansion unit 115.

Reference numeral 1203 denotes an image memory in which an image of a small size as a processing result is written.

Reference numeral 1204 denotes a unit for designating the number of colors. Ordinarily, a high picture quality is realized by recording the image of a large number of bits. When the remaining amount of the image memory is becoming lacking, the image size is saved by reducing the number of colors.

The method of saving the number of colors is realized not only by the operation by RGB but also by using YUV data. In this case, since the human being is more sensitive to luminance than to the color difference, it is sufficient to remarkably reduce the number of bits of the color difference signal.

The features of the embodiments of the digital camera described above will now be summarized as follows.

(1) When the remaining amount of the image memory is smaller than the predetermined amount, the image data is automatically selected by using the memory management information of the image memory such as recording date/time, final accessing date/time, accessing frequency, and the like, the image data is moved to another image server or the like by communication, and an image memory necessary for new photographing is reserved.

(2) There is a feature that the remaining amount of the image memory is detected by using a plurality of threshold values in accordance with the photograph mode which is used by the photographer. That is, when the user intends to record an image of high precision which needs a large amount of memory, many images are communicated. When the user wants to record an image of low resolution which needs only a small amount of memory, the photographer can photograph by communicating a small amount of images.

(3) When the photographer photographs or just after he photographed, the communication image is selected by using the marking information of the image inputted by the photographer. This method is a control method using a principle such that, ordinarily, when the photographer takes a picture, he has already grasped by feeling whether the photographed image is a good picture or not.

(4) By performing image processes to the image which was automatically selected by a method similar to that mentioned in the above item (1), namely, by executing the change of the compressing method by expanding the original image and recompressing it, the change of the compression parameters, the reduction of the number of constructing bits of the pixel also including the binarization, the reduction of the resolution by resampling, or the like, the compression ratio of the recorded image is raised and a memory necessary for recording a new image is reserved without erasing the original images. The contents of the above items (1) and (4) are not contradictory. For example, in case of using wireless means such as PHS or the like as communicating means, the data cannot be always communicated. Therefore, by combining the control procedures of (1) and (4) and executing the image processes such as recompression and the like when the transfer fails, the invention can cope with the use under a variety of environments.

According to the embodiment, therefore, the foregoing problems of the memory capacity which is limited in the ordinary digital camera can be solved by transmitting the image or reducing the image size by executing the image processes. Even at a photographing spot, the user can quickly photograph without losing a shutter chance.

Since the above control is realized by the transmission and process of the image or by the control of the CPU, memory, or the like, a construction is simple. Such a control can be realized even in a digital camera with a transmitting apparatus or a digital camera with a work memory. Therefore, the realization of miniaturization of the digital camera, low electric power consumption, and low costs is not obstructed. It can be said that the invention will be useful in future. Particularly, the operation to erase the photographed image at the photographing spot psychologically forces a burden on the photographer. Although a resistance feeling of the user to such a work is strong, it can be avoided by the transmission and the artificial deterioration of the image, so that there is a large advantage such that even an unnecessary or defective image can be reserved any way. A photographing apparatus such that the apparatus itself automatically transmits the image signal stored in the image memory and can write a new image signal into this memory even at the time of a next photographing is also included in the scope of the invention.

(Other Embodiments of the Invention)

The invention can be also applied to a system constructed by a plurality of apparatuses (for example, host computer, interface device, and the like).

A construction such that to realize the function of the embodiment mentioned above, program codes of software to realize the function of the embodiment are supplied to an apparatus connected to various devices or a computer in a system so as to make the various devices operative, and the various devices are operated in accordance with programs stored in the computer (CPU or MPU) of the system or apparatus, thereby embodying the invention is also included in the scope of the invention.

In this case, the program codes themselves of the software realize the function of the embodiment mentioned above. The program codes themselves and means for supplying the program codes to the computer, for example, a storing medium in which the program codes have been stored construct the invention. As a storing medium to store the program codes, for example, any one of a floppy disk, a hard disk, an optical disk, a magnetooptic disk, a CD-ROM, a magnetic tape, a non-volatile memory card, an ROM, and the like can be used.

In not only a case where the function of the foregoing embodiment is realized by executing the supplied program codes by the computer but also a case where the function of the foregoing embodiment is realized in cooperation with the OS (Operating System) by which the program codes are operating by the computer or another application software or the like, the program codes are obviously included in the embodiment of the invention.

Further, a case where after the supplied program codes were stored in a memory provided for a function expanding board of the computer or a function expanding unit connected to the computer, the CPU or the like equipped to the function expanding board or the function expanding unit executes a part or all of the actual processes on the basis of an instruction of the program codes, and the function of the foregoing embodiment is realized by the process is also obviously included in the invention. As described above, according to the portable electronic apparatus and image processing method of the embodiment, a memory capacity of the image memory can be substantially increased while reserving the photographed image, the number of images which can be photographed by the camera can be sufficiently increased without using the flash memory card, smart memory, or the other memories of a large capacity as in the conventional apparatus, accordingly, without enlarging the size of camera.

According to the recording medium in which the programs have been recorded in the embodiment, the process for substantially increasing the memory capacity of the image memory while reserving the photographed images can be executed by the computer.

According to the photographing apparatus of the embodiment, when the remaining amount of the image memory is small, the image according to a predetermined condition is selected from the images stored in the image memory and is transmitted to the outside or is subjected to proper processes and can be restored. Thus, the memory capacity of the image memory can be substantially increased while reserving the photographed images. The number of images which can be photographed by the camera can be sufficiently increased without using the flash memory card, smart memory, or the other memories of a large capacity as in the conventional apparatus, accordingly, without enlarging the size of camera.

According to the embodiment, in case of selecting, transmitting, and processing an image, a condition such that the photographing date is old, the accessing frequency is small, the number of colors is small or large, or the like is used as a selecting condition, thereby making it possible to transmit and process only an image of a small application field or an unnecessary image obtained due to a defective photographing or the like.

According to the embodiment, by adding the marking to the photographed image and setting such a marked image to the selecting condition, the priority to execute the transmission or process can be allocated to the photographed images.

According to the embodiment, when the photograph mode is changed, the process for selecting the image is performed in accordance with the image size in the photograph mode, therefore, even if there is a mode change, the image memory can be certainly reserved.

According to the embodiment, since the process for the image is executed when there is a photographing instruction, the image memory is certainly reserved when the shutter is depressed, and the photographed image can be certainly held.

After the selected image was transmitted or processed, the image is erased from the image memory and an empty space in the memory can be obtained.

Since the selected image or the like is transmitted in a wireless manner, the image can be preserved by a memory or the like of an apparatus on the reception side.

By providing the communicating means of the cellular phone, the selected image can be easily transmitted through the telephone line.

By providing each means such as microphone, speaker, audio process, or the like, the photographing apparatus can be also used as a cellular phone.

By dividing the photographing apparatus into two blocks, mutually rotatably coupling those blocks, providing the microphone for the first block, and providing the speaker for the other block, the photographing apparatus can be used in the most suitable form when it is used as a cellular phone.

By providing the image pickup means for one block and providing the display means for the other block, for instance, the photographer can be also photographed while displaying a self portrait of the photographer by rotating the block.

When the selected image is processed, it is compressed or the resolution is reduced or the number of colors is decreased and, after that, the resultant image data is stored into the image memory, thereby preserving the image in a state where the picture quality is slightly deteriorated, so that an empty space in the memory can be assured.

According to the recording medium on which the programs have been recorded, when the remaining amount of the image memory of the camera decreases, the processes such that the image according to the predetermined condition is selected from the images stored in the image memory and is transmitted to the outside or is subjected to a proper process and is restored can be executed by the computer built in the camera, so that the number of images which can be photographed by the camera can be increased.

Further, when the process to detect the remaining amount of the image memory of the camera in accordance with the setting of the photograph modes of the different image sizes is executed by the computer built in the camera, the necessary data can be obtained.

What is claimed is:

1. An electronic apparatus comprising:
   an image pickup device that photographs an object and outputting an image signal;
   a memory control device that allows said image signal to be stored into an image memory device;
   a comparing device that compares remaining capacity of said image memory device with a size of another image signal to be photographed in a photographing mode of said image pickup device, wherein the photographing mode of said image pickup device specifies the size of the another image signal;
   a selecting device that automatically selects one of image signals stored in said image memory device when said comparing device decides that the photographing of the another image signal is impossible in the photographing mode of said image pickup device because a required amount of said image memory device for the photographing in said photographing mode is not available; and
   a communicating device that automatically transmits the image signal stored in said image memory device when a predetermined condition is satisfied so as to enable a new image signal to be stored into said image memory device.

2. An apparatus according to claim 1, further comprising an image selecting device that selects an image signal from said image memory device on the basis of a predetermined selecting condition, and wherein said communicating device transmits said selected image signal.

3. An apparatus according to claim 2, wherein said predetermined selecting condition is a condition to select an old one of said stored image signals, and further comprising a managing device that manages photographing times of said image signals for the purpose of said condition.

4. An apparatus according to claim 2, wherein said predetermined selecting condition is a condition to select an image signal in which an accessing frequency is small from said stored image signals, and further comprising a managing device that manages accessing frequencies of said image signals.

5. An apparatus according to claim 2, wherein said predetermined selecting condition is a condition to select an image signal in which the number of colors is small from said stored image signals, and further comprising a managing device that manages the numbers of colors of said image signals.

6. An apparatus according to claim 2, wherein said predetermined selecting condition is a condition to select an image signal in which the number of colors is large from said stored image signals, and further comprising a managing device that manages the numbers of colors of said image signals.

7. An apparatus according to claim 2, further comprising a marking device that adds a mark to the image signal which is outputted from said image pickup device, and wherein said predetermined selecting condition relates to the presence or absence of said marking.

8. An apparatus according to claim 1, wherein said communicating device is a wireless communicating device.

9. An image processing method comprising the steps of:
   storing a photographed image signal photographed by an image pickup device into an image memory device;
   comparing remaining capacity of said image memory device with a size of another image signal to be photographed in a photographing mode of said image pickup device, wherein said photographing mode of said image pickup device specifies size of the another image signal to be photographed;
   automatically selecting the photographed image signal when a photographing of the another image signal is decided to be impossible in the photographing mode of said image pickup device because a required amount of said image memory device for the photographing in said photographing mode is not available in the comparing step; and
   automatically transmitting the selected photographed image signal stored in said image memory device so as to enable the new image signal to be stored into said image memory device.

10. A computer readable recording medium in which a program to execute a procedure by the computer has been recorded, wherein said procedure comprises the steps of:
   storing a photographed image signal photographed by an image pickup device into an image memory device;
   comparing remaining capacity of said image memory device with a size of another image signal to be photographed in a photographing mode of said image pickup device, wherein said photographing mode of said image pickup device specifies size of the another image signal to be photographed;

automatically selecting the photographed image signal when a photographing of the another image signal is decided to be impossible in the photographing mode of said image pickup device because a required amount of said image memory device for the photographing in said photographing mode is not available in the comparing step; and automatically transmitting the selected photographed image signal stored in said image memory device so as to enable the new image signal to be stored into said image memory device.

11. A computer readable recording medium in which a program to execute by the computer has been recorded, wherein said program comprises the steps of:

storing a first image signal photographed by image pickup means in a first photographing mode of said image pickup means into image memory means;

detecting a required amount of said image memory means necessary to store a second image signal to be photographed based on information specified in a second photographing mode of said image pickup means;

discriminating whether the photographing of the second image signal by said image pickup means can be performed in the second photographing mode or not on the basis of said detected required amount;

automatically selecting the first image signal on the basis of a predetermined selecting condition from said image memory means when a result of said discrimination indicates that the photographing of the second image signal is impossible because the required amount is not available in said image memory means; and transmitting said selected first image signal.

12. A computer readable recording medium in which a program to execute by the computer has been recorded, wherein said program comprises the steps of:

storing a first image signal photographed by image pickup means in a first photographing mode of said image pickup means into image memory means;

detecting a required amount of said image memory means necessary to store a second image signal to be photographed based on information specified in a second photographing mode of said image pickup means;

discriminating whether the photographing of the second image signal by said image pickup means can be performed in the second photographing mode or not on the basis of said detected required amount;

automatically selecting the first image signal on the basis of a predetermined selecting condition from said image memory means when a result of said discrimination indicates that the photographing of the second image signal is impossible because the required amount is not available in said image memory means; and processing said selected first image signal and supplying the processed image signal to said image memory means.

13. A computer readable recording medium according to claim 12, wherein said program further comprises the steps of:

storing a photograph mode of a photographing apparatus;

storing a size of image which is photographed in said photograph mode; and discriminating the image based on whether the size of image is large or small.

* * * * *